United States Patent
Psaltis et al.

(10) Patent No.: US 6,862,121 B2
(45) Date of Patent: Mar. 1, 2005

(54) METHOD AND APPARATUS FOR HOLOGRAPHIC RECORDING OF FAST PHENOMENA

(75) Inventors: Demetri Psaltis, Pasadena, CA (US); Gregory J. Steckman, San Gabriel, CA (US); Zhiwen Liu, Pasadena, CA (US); Theodore W. Haensch, Garching (DE); John Hong, Thousand Oaks, CA (US); Martin Centurion, Pasadena, CA (US)

(73) Assignee: California Institute of Technolgy, Pasadena, CA (US)

( * ) Notice: Subject to any disclaimer, the term of this patent is extended or adjusted under 35 U.S.C. 154(b) by 93 days.

(21) Appl. No.: 10/163,039

(22) Filed: Jun. 5, 2002

(65) Prior Publication Data

US 2002/0191239 A1 Dec. 19, 2002

Related U.S. Application Data

(60) Provisional application No. 60/297,188, filed on Jun. 7, 2001, provisional application No. 60/296,552, filed on Jun. 6, 2001, and provisional application No. 60/296,529, filed on Jun. 5, 2001.

(51) Int. Cl.[7] .................................................. G03H 1/12
(52) U.S. Cl. .............................. 359/11; 359/10; 359/35
(58) Field of Search ............................... 359/26, 25, 1, 359/3, 10, 11, 22, 24, 27, 28, 29, 35; 348/40

(56) References Cited

U.S. PATENT DOCUMENTS

| | | | | |
|---|---|---|---|---|
| 3,633,987 A | * | 1/1972 | Brooks ........................... | 356/2 |
| 5,299,035 A | * | 3/1994 | Leith et al. ..................... | 359/9 |
| 5,313,315 A | | 5/1994 | Feinberg et al. ................ | 359/4 |
| 5,448,417 A | | 9/1995 | Adams ....................... | 359/856 |

OTHER PUBLICATIONS

S. Suzuki, Y. Nozaki, H. Kimura, 'High–speed holographic microscopy for fast–propagating cracks in transparent materials', Appl. Opt., vol. 36, No. 28, Oct. 1, 1997, pp. 7224–7233.*
S. Schedin, G. Pedrini, H. J. Tiziani, F. M. Santoyo, 'Simultaneous three–dimensional dynamic deformation measurements with pulsed digital holography', Appl. Opt., vol. 38, No. 34, Dec. 1, 1999, pp. 7056–7062.*
Z. Liu, G. J. Steckman, D. Psaltis, 'Design of a nanosecond holographic recording system', Optical Memory and Neural Networks, vol. 12, No. 1, 2003, pp. 19–25.*
Z. Liu, M. Centurion, G. Panotopoulos, J. Hong, D. Psaltis, 'Holographic recording of fast events on a CCD camera', Opt. Lett., vol. 27, No. 1, Jan. 1, 2002, pp. 22–24.*
M. Centurion, Z. Liu, G. J. Steckman, G. Panotopoulos, J. Hong, D. Psaltis, 'Holographic techniques for recording ultrafast events', Proc. SPIE, vol. 4737, Apr. 3–4, 2002, pp. 44–50.*

(List continued on next page.)

*Primary Examiner*—Thong Nguyen
*Assistant Examiner*—Arnel C. Lavarias
(74) *Attorney, Agent, or Firm*—Daniel L. Dawes; Myers Dawes Andras & Sherman LLP

(57) ABSTRACT

Holographic methods for recording fast movies whose speed is limited by the laser pulse duration if the recording material has sufficient sensitivity to reliably record a frame of the fast event with a single pulse. The method we describe uses the selectivity of multiplexed holograms to resolve frames that are recorded with adjacent pulses. Specially designed pulse generators are used to generate the signal and reference pulse trains. We experimentally demonstrate the system by making movies of laser induced shock waves with a temporal resolution of 5.9 ns, limited by the pulse width of the Q-switched Nd:YAG laser used in the experiments.

19 Claims, 10 Drawing Sheets

OTHER PUBLICATIONS

Z. Liu, G. J. Steckman, D. Psaltis, 'Holographic recording of fast phenomena', Appl. Lett., vol. 80, No. 5, Feb. 4, 2002, pp. 731–733.*

M. Centurion, Y. Pu, Z. Liu, D. Psaltis, T. W. Hansch, 'Holographic recording of laser–induced plasma', Opt. Lett., vol. 29, No. 7, Apr. 1, 2004, pp. 772–774.*

Weiner, A.M. et al., "Femtosecond Spectral Holography," IEEE J. Quantum Electronics, vol. 28, No. 10, Oct. 1992, pp. 2251–2261.

Renn, Alois et al., "Spectral Hole Burning and Hologram Storage," Applied Optics, vol. 26, No. 19, Oct. 1, 1987, pp. 4040–4042.

* cited by examiner

Fast changing object

 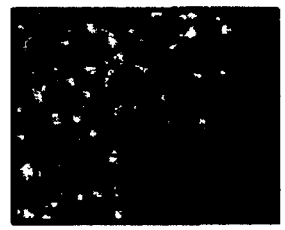 
FIG. 8A  FIG. 8B  FIG. 8C
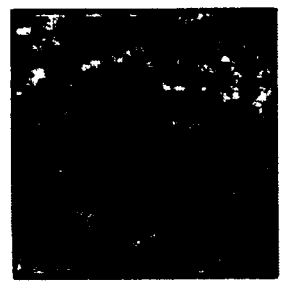 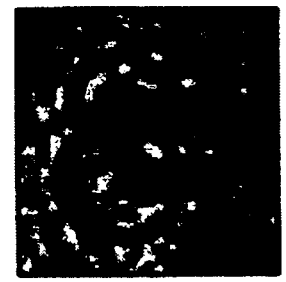 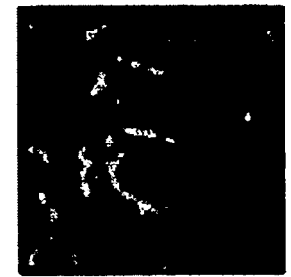
FIG. 9A  FIG. 9B  FIG. 9C
 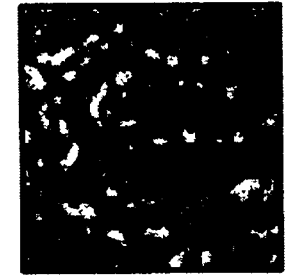 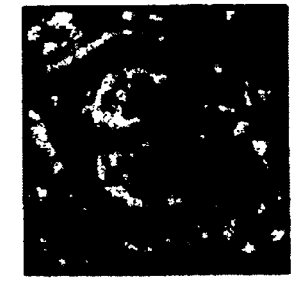
FIG. 9D  FIG. 9E  FIG. 9F

METHOD AND APPARATUS FOR
HOLOGRAPHIC RECORDING OF FAST
PHENOMENA

RELATED APPLICATIONS

The present application is related to U.S. Provisional Patent Application Ser. No. 60/296,529, filed Jun. 5, 2001, to Ser. No. 60/296,552, filed Jun. 6, 2001 and to Ser. No. 60/297,188, filed Jun. 7, 2001 which priority is claimed under 35 USC 119 and which is incorporated herein by reference.

BACKGROUND OF THE INVENTION

1. Field of the Invention

The invention is related to the field of holographic methods for recording fast movies whose speed is limited by the laser pulse duration if the recording material has sufficient sensitivity to reliably record a frame of the fast event with a single pulse.

2. Description of the Prior Art

Monitoring fast phenomena is of interest to science and engineering since it provides data about the dynamics of physical processes. For instance, the pump-probe technique is widely used in nondestructive and repeatable measurements. For one dimensional imaging (e.g. lifetime measurements), streak cameras with subpicosecond resolution can be used. Recording movies of fast events can be accomplished with a set of sensors. The light from the object is gated electronically on to each sensor (intensified CCD) while the image is broadcasted. Limited by weak intensity and silicon circuit speed, about 10 frames can be recorded with the time resolution of 10 ns. Since the early days when holography was invented, people have been studying high speed events using holographic techniques. A well known example is double exposure interferometry. Multiple frames can be stored and reconstructed separately using multiplexing techniques. Previous work has focused on spatial multiplexing where holograms are recorded at different locations of the recording medium. In an early report, a 100 ps laser pulse is used to store five frames. In another method, a wave front preserving optical delay line (a White cell) and a specially graded beam splitter is used to generate the reference and signal pulse trains. The frame interval can be as short as 28.3 ns. Spatial multiplexing by rotating the recording medium has also been report. Pulse holograms have also been angularly multiplexed taking advantage of the thickness of the recording medium. In one method, three lasers are used to generate three reference beams with different angles and each laser fires a pulse in a different time. The frame interval is about 1 $\mu$s. A rotating mirror or electro-optic switches have also been used to generate the reference beams. In these efforts, the speed is limited by electronics or mechanical scanning.

In spatial multiplexing, the number of frames is limited by the recording medium area and the beam diameter, not the dynamic range of the recording material. Furthermore, in general the direction of signal beam changes from pulse to pulse (except if the recording medium is rotated) and thus it changes the perspective of the object. It also makes the interferometry between any two of the recorded frames more difficult.

BRIEF SUMMARY OF THE INVENTION

The invention is defined as an apparatus for recording a timed sequence of holographic frames of an object comprising a medium or CCD camera for recording multiple holograms, such as a thick holographic recording medium. In a broad sense, a CCD camera can also be considered as a recording medium, so that "medium" will be understood in this specification to include any photochemical or electronic image or data capturing object now known or later devised. A source, such as a laser, of a plurality of at least partially coherent signal pulses illuminates the object, each of which signal pulses propagate in the same spatial direction. A source, such as a laser, of a plurality of at least partially coherent reference pulses, each of which reference pulses propagate with a different optical property such as a different spatial direction of propagation, a different wavelength, a different phase or time delay, a different polarization, or any optical parameter by which one electromagnetic wavefront can be differentiated from another.

However, it is to be understood that partially coherent sources may also be used in appropriate applications and that other portions of the electromagnetic spectrum may be employed other than visible light. In the embodiment where light is used, optics or an optical system is then used to direct the plurality of coherent signal pulses scattered from the object onto the medium and to direct the plurality of coherent reference pulses onto the medium to multiplex holograms corresponding to the timed sequence of holographic frames recorded in the medium arising from interference between the plurality of signal and reference pulses. Each of the multiplexed holograms recorded in the medium includes amplitude and phase information of the scattered pulse from the object, which includes or from which three dimensional information relating to the object can be known.

The apparatus further comprises a source of radiation for reconstructing the timed sequence of holographic frames recorded in the medium in which different ones of the timed sequence of holographic frames are reconstructed according to optical property of the source.

The source of the plurality of coherent signal pulses provides pulses separated by picosecond or femtoseconds intervals or less with a different hologram being generated corresponding to each pulse.

In the illustrated embodiment the source of the plurality of coherent signal pulses comprises a signal pulse train cavity and the source of the plurality of coherent reference pulses comprises a reference pulse train cavity, which operates synchronously or at least in temporally related manner with the signal pulse train cavity. The reference pulse train cavity generates reference pulses each with a different propagation direction. The time intervals between the plurality of at least partially coherent signal and reference pulses are varied by tuning the signal and reference pulse train cavity.

Again in the illustrated embodiment the reference pulse train cavity comprises at least a pair of opposing cavity mirrors at opposing ends of an optical axis of the reference pulse train cavity. The reference pulses are each generated with a different propagation direction by slanting one of the cavity mirrors relative to the optical axis to avoid optical symmetry within the reference pulse train cavity.

In another embodiment, the invention is defined as an apparatus for recording a femtosecond sequence of holographic frames of an object comprising a spectrally selective medium for recording multiple holograms and a source of a coherent signal pulse for illuminating the object such as a femtosecond laser. A pulse generator generates a spectral domain of signal and reference pulses. A plurality of delay lines disposed in the spectral domain of the generator result in or generate a timed sequence of pulses having no common spectrum. An optical system then directs the signal pulse scattered from or transmitted through the object onto the medium. In the illustrated embodiment the medium is spectral hole burning medium.

The apparatus further comprises a means for disabling all but a selected one of the plurality of delay lines to reconstruct the hologram in the medium at the selected spectral component, such as a mechanically actuated shutter mechanism or an electro-optical shuttering system.

In another embodiment the medium for recording multiple holograms comprises at least one frame of a CCD camera image. Each different spatial direction of the plurality of coherent reference pulses corresponds to a different interference pattern or carrier frequency. The apparatus further comprises a means for Fourier transforming each hologram; a means for selectively filtering the Fourier transform of each hologram to select one of the multiple holograms recorded in the at least one frame of the CCD camera image; and a means for inversely Fourier transforming the selectively filtered Fourier transform of each hologram to reconstruct an image of the selected hologram. These various means may be comprised of a computer, digital or analog signal processing circuitry or optical processing devices.

The invention is also directed to an optical generator for directing a processed light beam onto an object comprising an optical divider which divides an input light signal into a plurality of separate signals, each characterized by an optical parameter. An optical processor modifies the characterizing optical parameter of each of the plurality of separate signals. An optical combiner combines each of the modified separate signals into a beam directed onto the object.

In one embodiment the optical divider comprises a first grating for receiving an input light pulse and for diffracting the input light pulse into a plurality of spectral components. The optical processor comprises multiple optical delay lines for delaying each of the spectral components by a selected amount of time. The optical combiner comprises a second grating for receiving the delayed spectral components and outputting a plurality of spectral components corresponding to the input light pulse. The multiple optical delay lines comprise a stepped glass pyramid with a corresponding multiple number of steps of differing thickness, and a shutter for selecting one the spectral components if desired. The stepped glass pyramid can also be replaced by an equivalent staircase mirror.

In another embodiment the optical divider comprises a plurality of mirrors disposed in a spread beam of light. Each mirror intercepts a fractional portion of the wavefront of the spread beam. The optical processor comprises a differing position of each of the plurality of mirrors in the spread beam so that light reflected from each mirror will have a different total optical path to the object or time delay than other ones of the plurality of mirrors. A shutter mechanism may be employed to select the delayed pulse which is propagated. The optical combiner comprises means for directing light from each of the plurality of mirrors to the object which may simply be the angular orientation of each mirror with respect to the object so that all of the pulse divisions converge on the object.

The invention is also defined as a method comprising the steps for performing the functions of the foregoing elements and means.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 8A–8C are a sequence of frames showing the optical breakdown in air where a blade is placed near the focal point.

FIGS. 9a–9c are a sequence of frames showing the interaction of double shock wave in a first example.

FIGS. 9d–9f are a sequence of frames showing the interaction of double shock waves in a second example.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
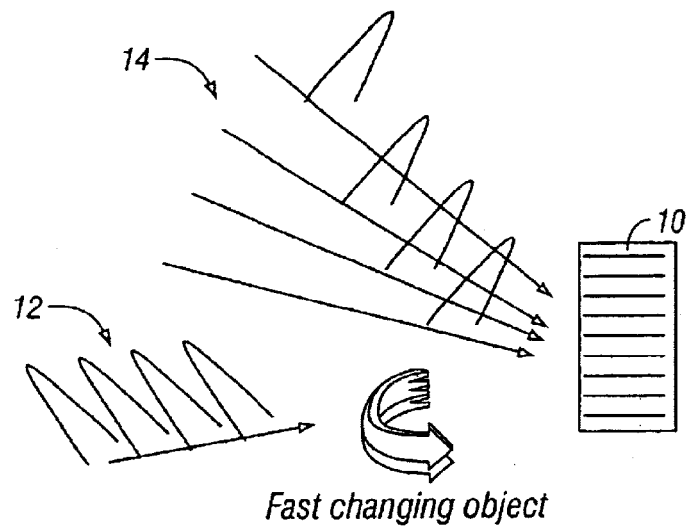
FIG. 1 is a diagrammatic depiction of a angularly multiplexed pulse hologram.

The method illustrated in FIG. 1 uses the angular selectivity of thick holograms 10 to resolve frames that are recorded with adjacent pulses. Two specially designed cavities are used to generate the signal and reference pulse trains. The invention is illustrated by making movies of laser induced shock waves with a temporal resolution of 5.9 ns, limited by the pulse width of the Q-switched Nd:YAG laser used in the experiments.

The advantage of the method of the invention is that the speed is limited by the pulse width of the laser instead of a scanning mechanism. Therefore it can be used even with subpicosecond pulses. The duration of the movie or the number of frames is limited by the dynamic range of the recording material, not its spatial extent. We have previously recorded up to 10,000 holograms in one location. The system is diagrammatically shown in FIG. 1, a sequence of signal pulses 12 and reference pulses 14 are incident on the holographic medium 10 during the recording.

The signal pulses 12 all travel in the same direction while the direction of the reference pulses or beam 14 changes from pulse to pulse in order to angularly multiplex holograms 10. After the recording, a CW laser (not shown) at the same wavelength is used to read out individual frames according to conventional principles. Depending on the incidence angle, different frames can be read out separately due to the angular selectivity of thick hologram 10.

Figure 2:
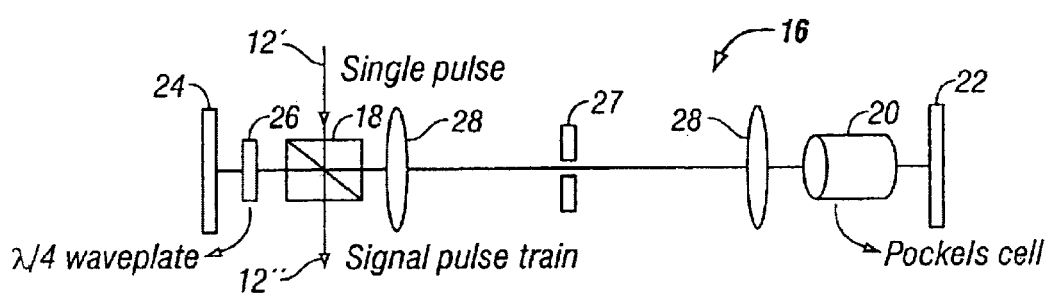
FIG. 2 is a diagram of a cavity for the signal pulse train generation.

In the illustrated embodiment, both the signal pulse trains 12 and the reference pulse trains 14 are generated by a single pulse from a frequency doubled Q-switched Nd:YAG laser (not shown) having a wavelength of 532 nm, a pulse width of 5.9 ns, an energy per pulse 300 mJ and beam diameter of 9 mm. FIG. 2 diagrammatically shows the cavity 16 that generates the signal pulse train 12. A polarizing beam splitter 18 is used to couple the vertically polarized incident pulse 12' into the cavity 16, which pulse 12' is polarized perpendicular to the plane of FIG. 2. A Pockels cell 20 is timed to behave like a temporary $\lambda/4$ wave plate to rotate the polarization of incident pulse 12' to the horizontal direction after it first enters the cavity 16.

Pockels cell 20 is turned off afterwards while pulse 12' travels from mirror 22 back towards opposite mirror 24. Pulse 12' is then trapped inside cavity 16 since the polarizing beam splitter 18 transmits that portion of the beam with a horizontal polarization. A $\lambda/4$ wave plate 26 is used to slightly rotate the polarization of pulse 12' and the induced vertical polarized component 12" is coupled out of cavity 16 from polarizing beam splitter 18. A collimating slit 27 is also provided in cavity 16. A sequence of signal pulses are then generated and the pulse separation is equal to the round trip time of cavity 16. Two lenses 28 inside cavity 16 form an imaging system that compensates for beam diffraction.

Figure 3:
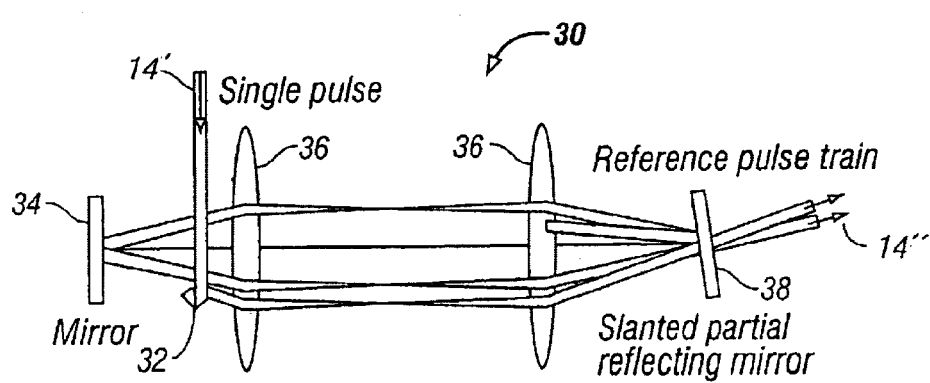
FIG. 3 is a diagram of a cavity for the reference pulse train generation.

The reference cavity 30 is shown diagrammatically in FIG. 3. The incident pulse 14' enters cavity 30 via a small coupling mirror 32. After coupling mirror 32, pulse 14' travels as if it had originated from the center of front mirror 34. Two lenses 36 form an imaging system and pulse 14' hits the center of rear mirror 38. If rear mirror 38 is parallel to front mirror 34, the reflected pulse 14' would travel backwards symmetrically with respect to the optical axis of cavity 30. After reflecting by front mirror 34, it would then get blocked by coupling mirror 32 when it tries to retrace the previous path. We break the symmetry of cavity 30 by slanting rear mirror 38 slightly. The pulse 14' is then reflected by rear mirror 38 and travels at a smaller angle towards the optical axis, just missing coupling mirror 32. The pulse hits the center of each cavity mirror 34 and 38 at slightly different angle after every round trip.

Pulses 14" are coupled out of the cavity by making one of the mirrors 34 or 38 partially reflecting. We generate five signal pulses 12 and reference pulses 14 out of a single pulse 12' from the Nd:YAG Q switched laser using the above method. The pulse separation is about 12 ns which can be changed by tuning the cavity length. Our current signal cavity is quite lossy due to the reflections from the optical components and the spatial filtering that is used to improve the beam profile and this limits us to only about 5 signal pulses. Improved cavity design should alleviate this problem. We recorded five plane wave pulse holograms in the Aprilis material.

Figure 4A:
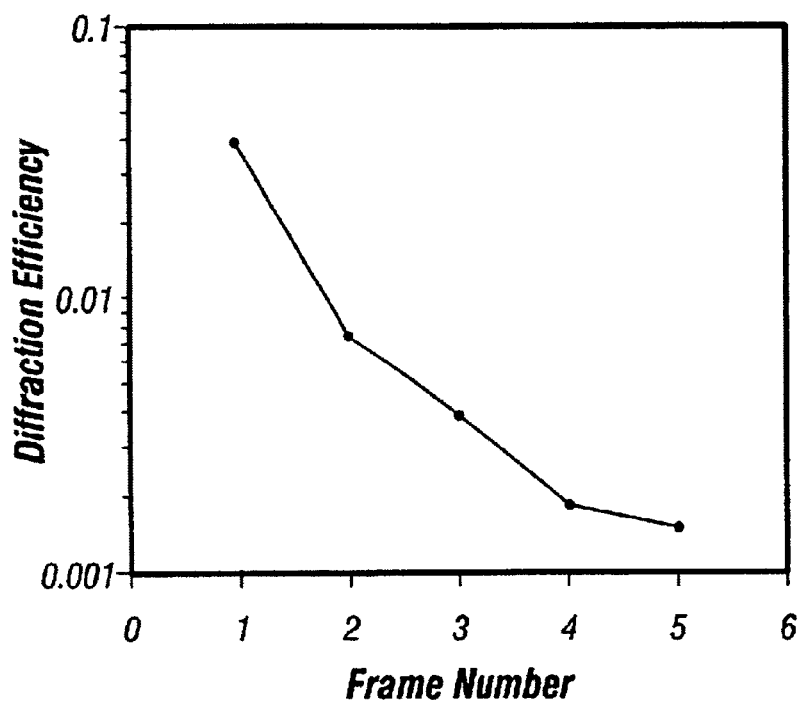
FIGS. 4a–4b is a graph of the diffraction efficiencies of five pulse hologram.
Figure 4B:
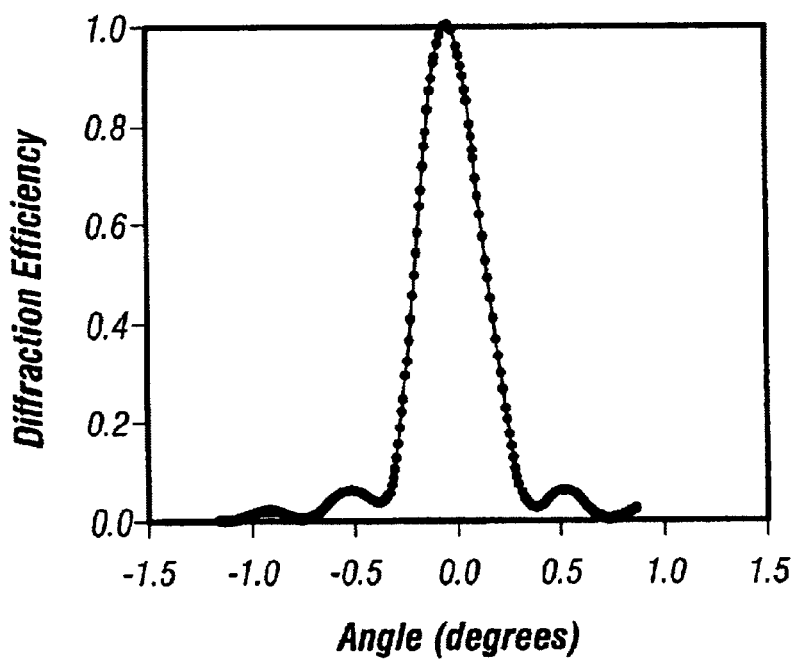

The diffraction efficiency of each frame and the angular selectivity curve are given in the graph of FIG. 4. FIG. 4 is a graph of the diffraction efficiencies of five pulse hologram and the selectivity curve of the first frame. Both the reference and signal pulse trains have a total energy of about 37 mJ. The pulse energy in the reference and signal pulse trains decays and the successively recorded holograms get weaker and weaker. Aprilis material ULSHSOO-7A-22 is used as the recording medium. The thickness of the material is 200 $\mu$m. The pre-exposure energy is about 2 J/cm$^2$ (white lamp). The Aprilis material yields a diffraction efficiency of approximately 1% for a 1.6 mJ/cm$^2$ exposure of CW illumination or a single 5.9 ns pulse. The diffraction efficiency when M holograms are superimposed goes as $\eta=(M\#/M)^2$ where M# is a material dynamic range parameter. The measured M# of the Aprilis material is 6. Since we typically can obtain high fidelity reconstructions with $\eta\sim10^{-4}$, movies with several hundreds of frames can be recorded.

Figure 5:
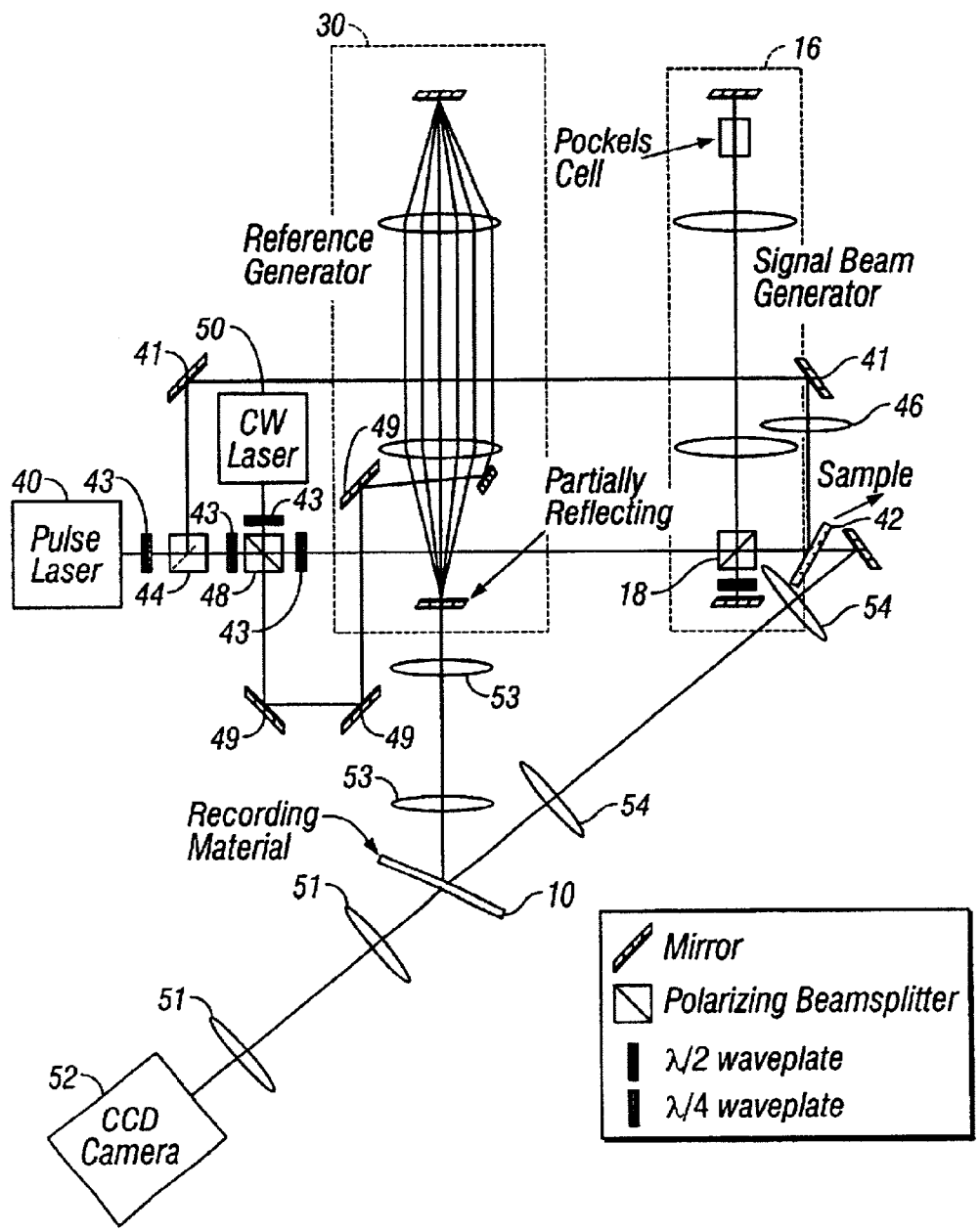
FIG. 5 is a diagram of a high speed holographic move camera devised according to the invention.
Figure 6A:
FIGS. 6A–6F are a sequence of frames showing the optical breakdown of PMMA under a laser pulse.
Figure 6B:
Figure 6C:
Figure 6D:
Figure 6E:
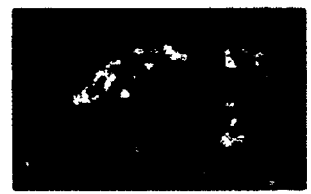
Figure 6F:

We used this movie camera to record optical breakdown events. Our single-pulse-pump record experimental setup is shown diagrammatically in FIG. 5. We split part of the pumping pulse from laser 40 using half wave plates 43, controllable polarization beam splitter 44, mirrors 41 and focus it using lens 46 on a sample 42. This pumping pulse can optically break down the object. A portion of the incident pulse beam from pulse laser 40 is simultaneously split by controllable polarization beam splitters 48 and 18 into a reference cavity 30 and signal cavity 16. The reference and signal pulse trains are then generated and directed onto the object or sample 42 and through optics 53 and 54 onto thick hologram 10 respectively as described in connection with FIGS. 3 and 2 respectively above. A sequence of angularly multiplexed frames are then recorded in medium 10. This sequence of angularly multiplexed frames can be reconstructed using CW laser 50 and CCD camera 52 using an appropriate optical focusing system or optics 51.

Light from laser 50 is directed by splitter 48 and mirrors 49 into reference cavity 30. Since only a portion of the light escapes from cavity 30 on each round trip within cavity 30, multiple reconstruction beams are provided which are incident at different angles on hologram 10. Because of the angular selectivity of hologram 10 a different image is reconstructed with each different angled reconstruction beam.

FIGS. 6a–6f is a sequence of six frames A–F showing the optical breakdown in PMMA. Frame A is recorded at about 1 ns before the pumping pulse vanishes. Frames A, B, C, D and E are the recorded frames and the frame interval is about 12 ns. F is the final direct image of the sample after the optical breakdown. The size of the image is 1.74 mm by 1.09 mm. The intensity of the pumping beam is about $1.6\times10^{12}$ W/cm$^2$. Frame A of FIG. 6 shows the plasma created by the pumping pulse. The tail is likely due to the discharge in the air in front of the sample 42. In frame B, a shock wave is clearly seen. The average propagating speed of the shock wave between frame, A and B is about 10 km/s and that between frame D and E is about 4 km/s.

Figure 7A:
FIGS. 7A and 7B are a sequence of frames showing the optical breakdown in air.
Figure 7B:

In FIGS. 7a–7b we show the breakdown in air. The size of the image is 2.76 mm by 1.17 nm. The intensity of the pumping beam is about $5.2 \times 10^{12}$ W/cm$^2$. Similarly, plasma is created in Frame A in FIG. 7 and soon a shock wave forms. The air discharging occurs in a region near the focal point of lens 46 and the length of that region is about equal to the depth of focus. A line of spark is visible during the experiment.

In FIGS. 8a–8c, we focus the pumping pulse near a blade (the dark rectangular shadow). The threshold of optical breakdown is lowered by the presence of the metal blade. The optical breakdown occurs mainly at a small region around the focal point which is close to the metal and produce a more spherical shock wave. The size of the image is 1.82 mm by 1.45 mm. A blade is put near the focal point of the pumping beam. The intensity of the pumping beam is about $1.6 \times 10^{12}$ W/cm$^2$.

We also focus two pumping beams by lenses (not shown) on PMMA and generate two shock waves as shown in FIGS. 9a–9f. The size of the image is 1.48 mm by 1.52 mm. In the first movie, the lower pumping pulse has higher energy as we can see from the plasma size in the frame of FIG. 9a. When the two shock waves meet as shown in the sequence of frames from FIGS. 9a to 9c, the one with higher pressure penetrates as shown in the frame of FIG. 9c. In the second movie, the two shock waves roughly have the same pressure, and they balance with each other in the middle as shown in the sequence of frames of FIGS. 9d–9f.

Figure 10:
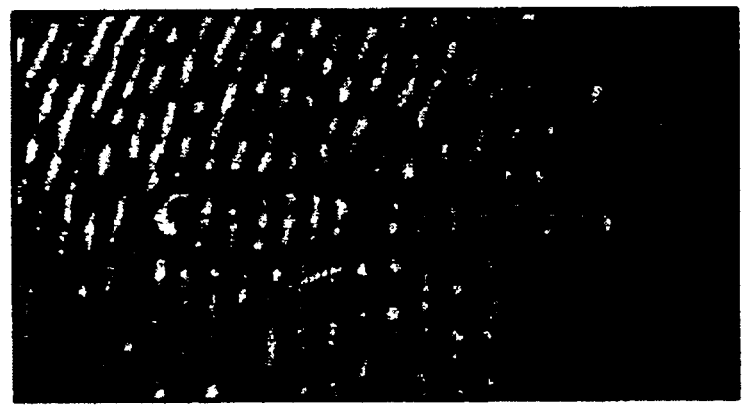
FIG. 10 is a photograph of the interferometry pattern between a fast movie frame and its reference wave.

A unique feature of the holographic movie is that it records the field and thus has both the amplitude and phase information. Phase changes can be detected by interfering two reconstructed frames or interfering the frame with the reference wave. We interfered the second frame of an air discharging movie with a reference signal (a plane wave). The fringes are shown in FIG. 10. Apparently, the refractive index inside the region surrounded by the shock front is different from that of the outside.

Figure 11A:
FIGS. 11a–11b are frames which are focused at different depths.
Figure 11B:

In the holographic reconstruction we can focus at different depths since the object field is reconstructed. This is shown in FIGS. 11a–11b. In FIG. 11A, the plasma created on the PMMA sample is in focus while in 11B, the shock wave due to the discharge in the air (in front of the sample) comes to focus by changing the position of the CCD camera. The angle between the pumping beam and the signal beam is about 20 degrees. The pumping pulse is focused at about 1 cm in front of the PMMA sample which is consistent with the measured image depth position difference between A and B.

The movies illustrated here are among the fastest ever recorded in two dimensions, comparable with the current state of the art of multi-camera systems. Holography provides the added advantages of recording three dimensional and phase information.

Most importantly, the method we describe can be extended to faster recording regimes by using shorter laser pulses. Moving to the 100 ps regime does not require major modifications of the apparatus describe above other than the laser source. When we extend this method to the femtosecond regime, the sensitivity of the holographic medium, the generation of the signal and reference beams, and the short coherence length of the pulsed laser need to be carefully examined before a femtosecond holographic movie camera can be built. Nevertheless either at the picosecond or the femtosecond regime, holography can allow us to see in two or three dimensions the time evolution of individual events at a speed that we have never been able to visualize before.

Figure 12:
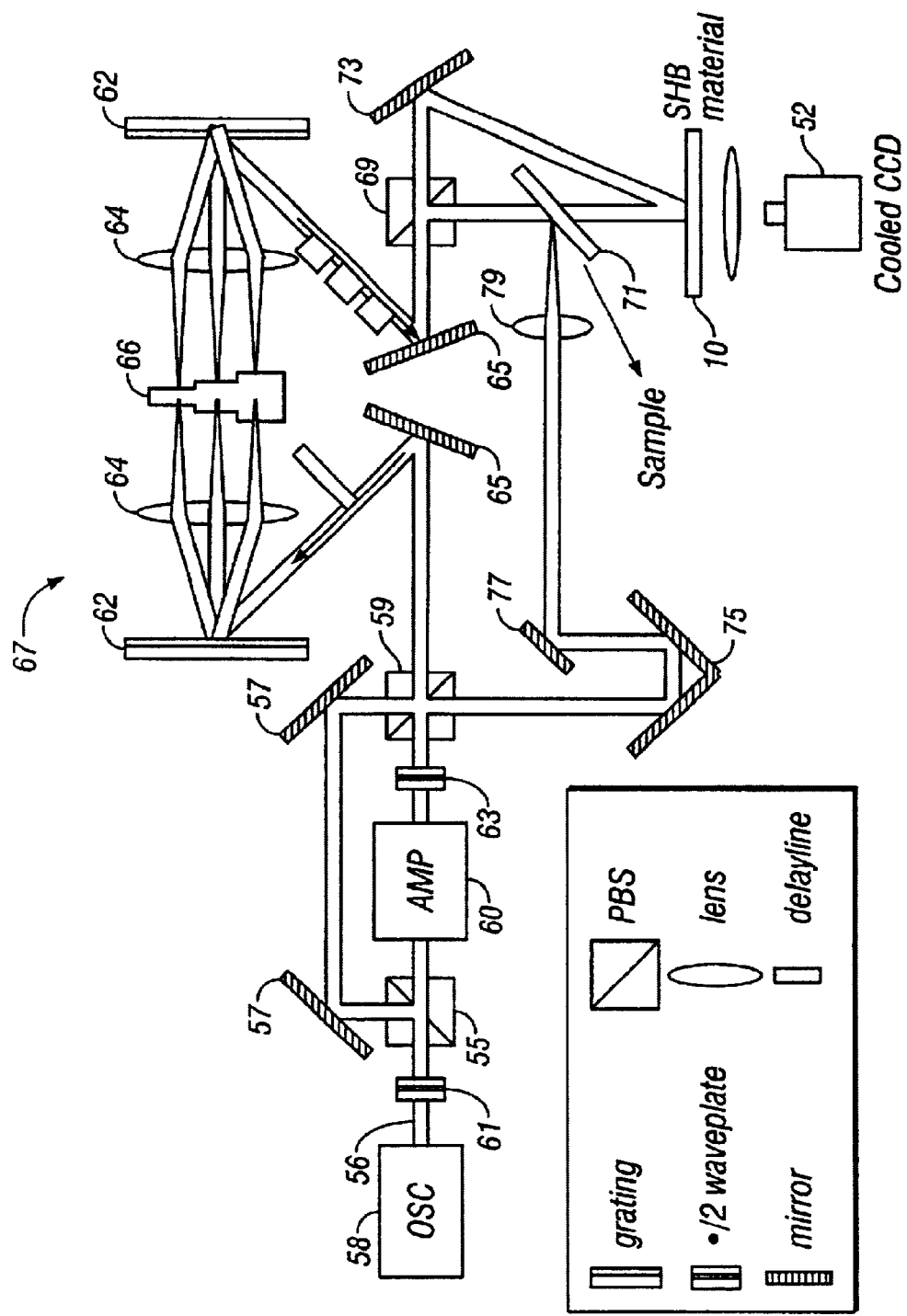
FIG. 12 is a diagrammatic depiction of a holographic system to record femtosecond events in spectral hole burning medium (SHB).

A holographic system to record femtosecond events in spectral hole burning medium is diagrammed in FIG. 12. There are several important issues on recording femtosecond pulse holograms. First is the response speed of recording material 10. Second is the short coherent length of the pulse. Typically, we require the reference and signal pulses overlap with each other inside the recording medium 10 in order to record their interference pattern or hologram. The hologram is only recorded in a thin slice and it reduces the multiplexing selectivity (either wavelength and angular selectivity). These problems can be solved by using spectral holography.

As shown in FIG. 12, a pulse from femtosecond oscillator 58 is amplified by regenerative amplifier 60 and directed by means of half wave plates 61 and 63, controllable polarization beam splitters 55 and 59 to corner reflector 75, mirror 77 and lens 79 to impinge on sample 71 to create an event therein. At the same time a portion of the light is directed to pulse generator 67 and used for recording. Light from laser 58 is routed around amplifier 60 during readout by means of controllable polarization beam splitter 55, mirrors 57 and split by controllable polarization beam splitter 59 via mirror 65 to pulse generator 67. Light is dispersed by a grating 62 and focused by a lens 64 through multiple delay lines 66. The back focal plane of lens 64 in pulse generator 67 is the pulse spectral domain. We insert a means for providing a selective delay line 66 in the spectral domain e.g. shutters and a stepped glass pyramid 66 with steps of different thickness. Since the generator of FIG. 12 is symmetric through its midline, stepped glass pyramid 66 can be equivalently replaced by a staircase-shaped mirror and used in combination with a single grating to perform the same function. A sequence of spectral pulses is created and without any common spectrum.

Figure 16A:
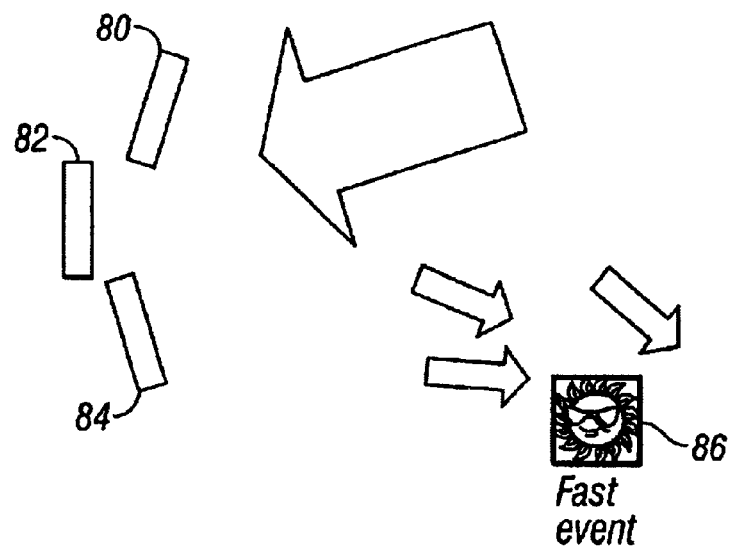
FIGS. 16a, 16b and 16c are diagrammatic depictions of the means and method of using wavefront division to provide illumination for a multiple frame holograph.
Figure 16B:
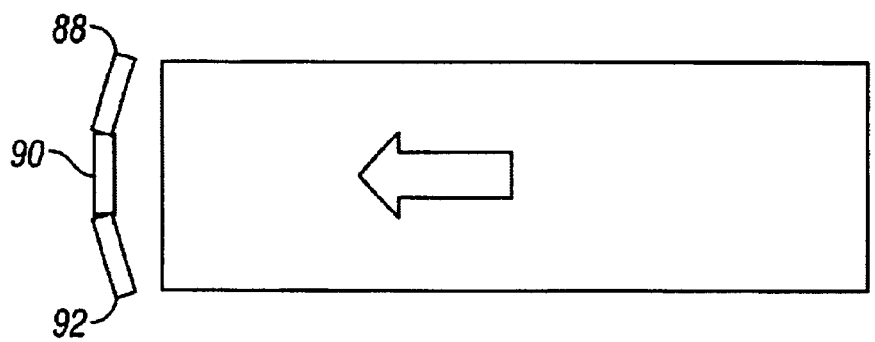
Figure 16C:
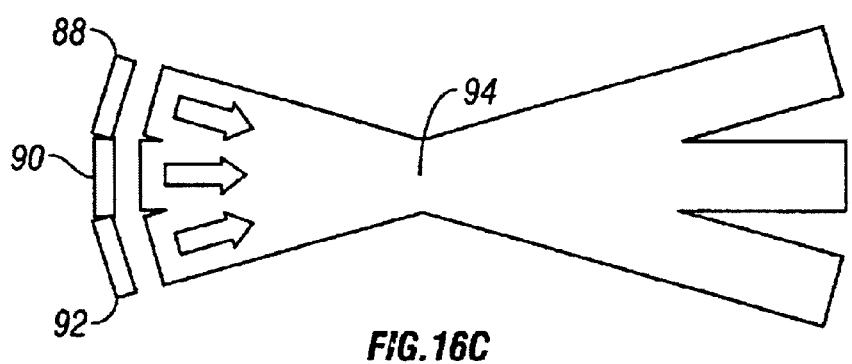

The invention also includes an arrangement for providing wavefront division, which in the illustrated embodiment is shown in the diagrammatic depictions of FIGS. 16a, 16b and 16c. FIG. 16a is a depiction of the method of using a plurality of staggered mirrors 80, 82 and 84 to receive light pulses from a laser (not shown). The pulsed input beam may be spread by appropriate optics to be large enough to impinge on all mirrors 80, 82 and 84. Although for simplicity only three mirrors are shown, it is expressly to be understood that any number may be employed depending on the needs of the application. For example, a mirror array of hundreds of separate small mirrors could be employed if the object or field 86 to be illuminated can be covered by the separate beams of the size which would be reflected from such an array. Mirrors 80, 82 and 84 are oriented so that each of the reflected pulses are focused or directed onto object 86. A shuttering mechanism (not shown) can also be combined with mirrors 80, 82 and 84 so that one of the pulses can be selected if desired. The salient point is that the time delay for the reflected pulse from each mirror 80, 82 and 84 is different, which allows interference with a distinctly angled, synchronously timed reference pulse, and the direction of propagation is different so that a multiple frame hologram of object 86 can later be reconstructed as described in this disclosure.

Similarly, FIGS. 16b and 16c show the use of multiple mirrors 88, 90 and 92 being used with a continuous wave (CW) light signal to form three corresponding beams, each having different directions of propagation. In this embodiment mirrors 88, 90 and 92 are not staggered but are arranged on an arc since there are no distinguishable time delays in a CW signal. FIG. 16b shows a CW input beam uniformly propagating onto mirrors 88, 90 and 92, each of which is set at a different angle to the direction of the incoming input beam. FIG. 16c depicts the reflected beams corresponding to mirrors 88, 90 and 92, each of which has a different propagation direction and which converge at a focal point 94 at which object 86 would be situated.

In the embodiment of FIG. 12 the delayed spectral pulses are output from right hand grating 62 to right hand mirror 65 and thence to beam splitter 69. The sequence of signal pulses are selectively directed to the sample or object 71 to be imaged as the signal pulses. Light is also sent from polarizing beam splitter 59 to corner reflector 75, mirror 77 and lens 79 to sample 71 as a pumping beam. Because hologram 10 records spectrally selectively the signal and reference beams need not be simultaneous. We can use this sequence of pulses to record a femtosecond movie on the event in sample 71.

After recording, we use oscillator or laser 58 to reconstruct or read out the hologram 10. The pulses from oscillator 58 go through the same pulse shaping processing in pulse generator 67 with the exception of bypassing amplifier 60 by means of beam splitters 55 and 59 and bypassing sample 71 by means of beam splitter 69 and mirror 73. The individual frame can be read out by blocking all, but one of the delay lines 66 or delay pulses.

Spectral hole burning medium 10 (SHB) is a frequency selective medium. Holograms recorded by different spectral component of the pulse are stored in different types of molecules. Because the sequence of pulses do not have common spectrum, no two frames are recorded in the same type of molecule and can thus reconstructed separately. The image recorded in SHB medium 10 can then been seen or recorded by CCD camera 52.

Figure 13:
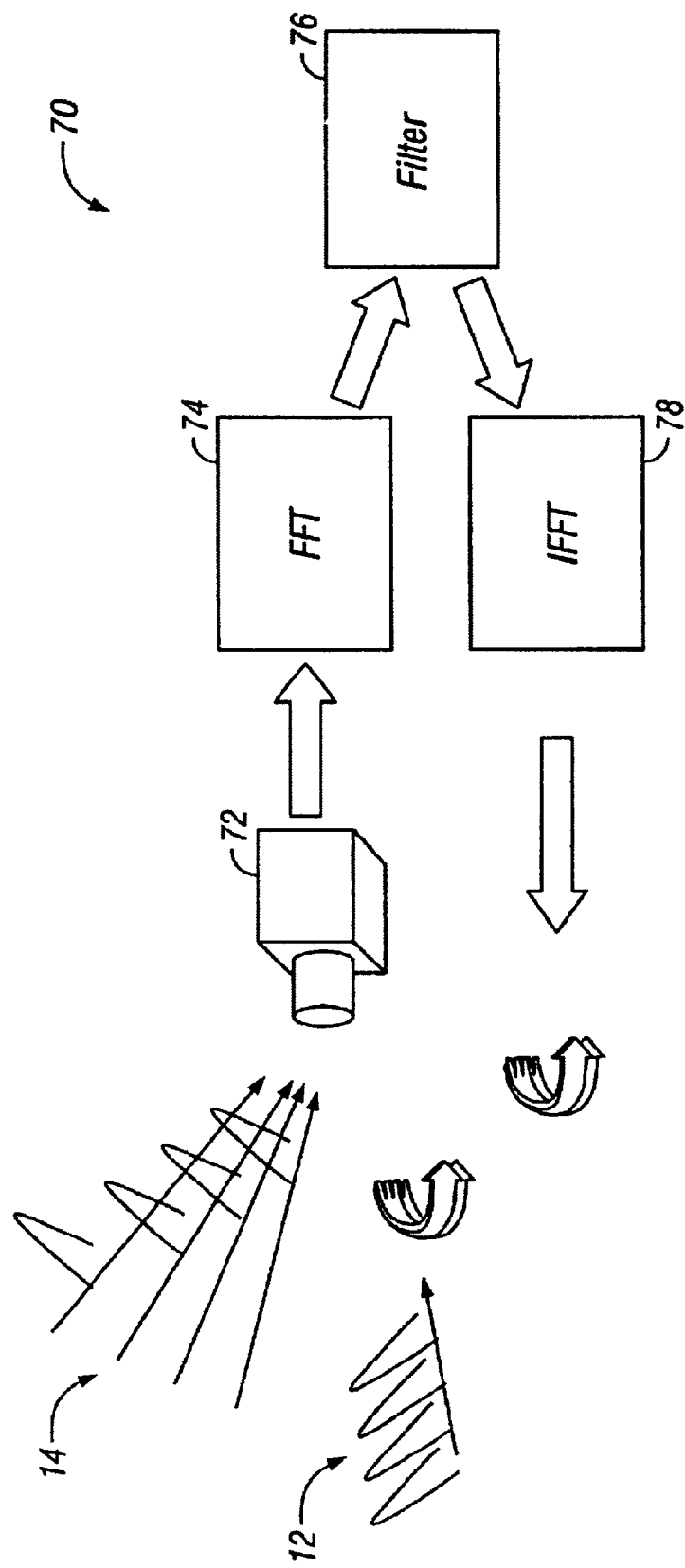
FIG. 13 is a diagrammatic depiction of a holographic system to record high speed holographic movies using carrier multiplexing in CCD cameras.

High-speed holographic movies at frame rates of more than 100,000,000 or even more than one trillion frames per second can be recorded according to the present invention in commercially available CCD cameras. In recording a fast holographic movie, the sensitivity and response speed of recording material are two very important issues CCD cameras are sensitive to a very broad spectrum ranging from infrared to ultraviolet. CCD cameras have high responsivity and low levels of light, e.g. typically down to hundreds of photons can be detected in one pixel. FIG. 13 diagrammatically depicts a system 70 in which pulsed holograms can be recorded in a CCD camera 72. Each hologram is recorded in succession with a slightly different reference angle as described above using a train of signal pulses 12 and a train of reference pulses 14. The entire sequence of exposures is made during one integration frame of CCD camera 72, i.e, CCD camera 72 continues the exposure through the whole sequence before outputting the photogenerated charges as a "multiply exposed" image or more precisely as an angularly multiplexed image.

Although each and all of the timed sequence holograms are superimposed in one detected CCD camera frame, each hologram can be independently reconstructed through digital spatial filtering in a computer subject to software control if the image bandwidth of each hologram is sufficiently low. Individual holograms can then be digitally filtered out and reconstructed by first performing a Fourier transform on the composite image at step 74, filtering a selected passband corresponding to the desired hologram at step 76, and then performing an inverse Fourier transform on the filtered result at step 78 using conventional algorithms. While the illustrated embodiment contemplates the use of a general purpose computer or personal computer for performing the method, it is expressly contemplated that any known or later discovered equivalent means may be substituted, such as customized logic circuitry, digital processing arrays, analog processing circuits or for that matter optical devices for performing the same functions.

Figure 14A:
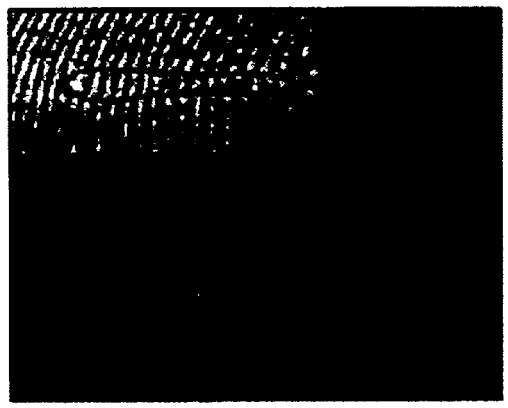
FIGS. 14a and 14b are photographic examples of a CCD hologram and its digital Fourier transform respectively.
Figure 14B:
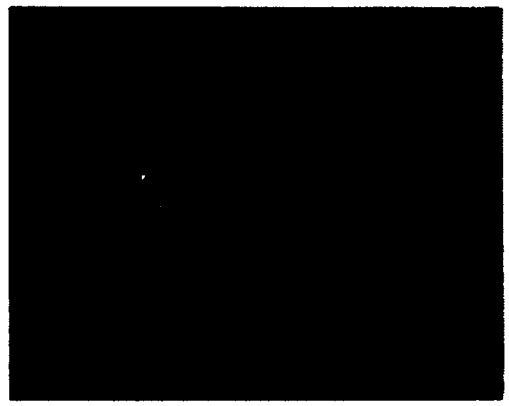
Figure 15A:
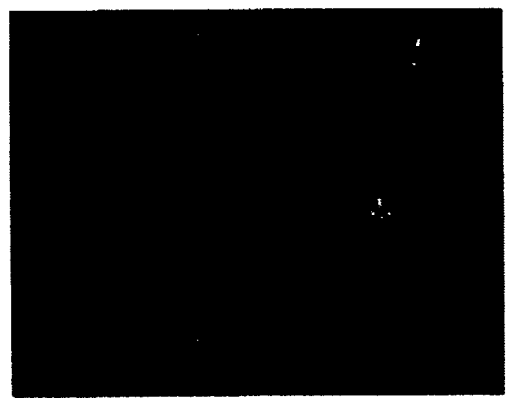
FIGS. 15a and 15b are the digital reconstruction of the hologram of FIG. 14b.
Figure 15B:
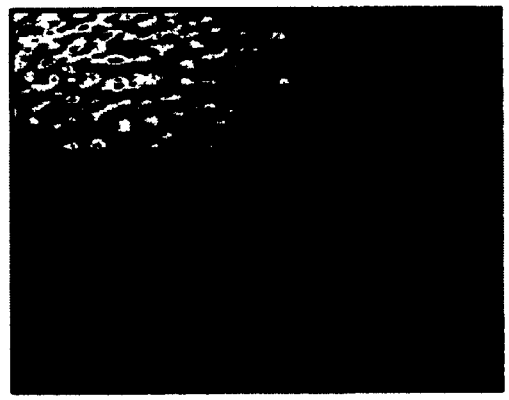

FIG. 14a shows a CCD hologram and FIG. 14b depicts its corresponding DC filtered Fourier transform. There are two side bands, and the position of the side bands is determined by the interference pattern frequency or the carrier frequency, which is changed by changing the reference beam incidence angle. One side band is filtered out at step 76 and the frame is reconstructed as shown in FIG. 15a, which is the filtered single sideband Fourier transform of FIG. 14b and in FIG. 15b which is the reconstructed image from FIG. 15a. One can imagine that by changing the reference beam angle or the carrier frequency, the frequency domain can be filled with different frames without overlapping with each other. Multiple frames can thus be recorded and reconstructed separately at extremely high speed using pulsed lasers.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for recording a timed sequence of holographic frames of an object comprising:
   a medium or camera for recording multiple holograms;
   a source of a plurality of at least partially coherent signal pulses illuminating the object;
   a source of a plurality of at least partially coherent reference pulses, each of which reference pulses propagates with different optical properties; and
   optics to direct the plurality of at least partially coherent signal pulses scattered from the object onto the medium or camera and to direct the plurality of at least partially coherent reference pulses onto the medium or camera to multiplex holograms corresponding to the timed sequence of holographic frames recorded in the medium or camera arising from interference between the plurality of signal pulses as scattered from the object and reference pulses as embodied in a value of an optical parameter of the signal pulses scattered from the object and reference pulses for each of the holographic frames,
   where the source of the plurality of at least partially coherent signal pulses comprises a signal pulse train cavity and the source of a plurality of at least partially coherent reference pulses comprises a separate reference pulse train cavity operating synchronously with the signal pulse train cavity, wherein the reference pulse train cavity generates reference pulses each with a different optical property.

2. The apparatus of claim 1 further comprising a source of radiation for reconstructing the timed sequence of holographic frames recorded in the medium or camera in which different ones of the timed sequence of holographic frames are reconstructed according to the different optical properties of the source.

3. The apparatus of claim 1 where source of a plurality of at least partially coherent signal pulses provides pulses separated by picosecond intervals or less, a different hologram being generated corresponding to each pulse.

4. The apparatus of claim 1 where source of a plurality of at least partially coherent signal pulses provides pulses separated by femtosecond intervals or less, a different hologram being generated corresponding to each pulse.

5. The apparatus of claim 3 where time intervals between the plurality of at least partially coherent signal pulses is varied by tuning the signal and reference pulse train cavities.

6. The apparatus of claim 1 where the reference pulse train cavity comprises at least a pair of opposing cavity mirrors at opposing ends of an optical axis of the reference pulse train cavity, and where the reference pulses are each generated with a different propagation direction by slanting one of the cavity mirrors relative to the optical axis to avoid optical symmetry within the reference pulse train cavity so plurality of reference pulses, each with a different spatial direction are generated from the reference pulse train cavity.

7. The apparatus of claim 1 where each of the multiplexed holograms recorded in the medium or camera includes amplitude, phase and three-dimensional information of the scattered pulse from the object.

8. The apparatus of claim 1 wherein the camera for recording multiple holograms comprises memory of more than one frame of a camera image and where each different spatial direction of the plurality of at least partially coherent reference pulses corresponds to a different interference pattern or carrier frequency corresponding to a different frame of the camera image.

9. The apparatus of claim 8 further comprising:
   means for Fourier transforming each hologram;
   means for selectively filtering the Fourier transform of each hologram to select one of the multiple holograms recorded in the at least one frame of the camera image; and
   means for inversely Fourier transforming the selectively filtered Fourier transform of each hologram to reconstruct an image of the selected hologram.

10. A method for recording a timed sequence of holographic frames of an object comprising the steps of:
    providing a medium or camera for recording multiple holograms;
    generating a plurality of at least partially coherent signal pulses for illuminating the object, each of which signal pulses propagate in the same spatial direction;
    generating a plurality of at least partially coherent reference pulses, each of which reference pulses have different optical properties;
    directing the plurality of at least partially coherent signal pulses scattered from the object onto the medium or camera; and
    simultaneously with the plurality of at least partially coherent signal pulses directing the plurality of at least partially coherent reference pulses onto the medium or camera to multiplex holograms corresponding to the timed sequence of holographic frames recorded in the medium or camera arising from interference between the plurality of signal pulses scattered from the object and reference pulses, where the step of generating the plurality of at least partially coherent signal pulses comprises generating a signal pulse train in a first optical cavity and where the step of generating the plurality of at least partially coherent reference pulses comprises generating a reference pulse train in a second optical cavity synchronously with generation of the signal pulse train, wherein each pulse of the reference pulse train has a different propagation direction.

11. The method of claim 10 further comprising the step of reconstructing the timed sequence of holographic frames recorded in the medium or camera in which different ones of the timed sequence of holographic frames are reconstructed according to the optical properties of the readout wave.

12. The method of claim 10 where the step of generating the plurality of at least partially coherent signal pulses generates pulses separated by picosecond intervals or less, a different hologram being generated corresponding to each pulse.

13. The method of claim 10 where the step of generating the plurality of at least partially coherent signal pulses generates pulses separated by femtosecond intervals or less, a different hologram being generated corresponding to each pulse.

14. The method of claim 10 wherein each pulse of the reference pulse train has a different propagation direction.

15. The method of claim 10 where there is a time interval between sequential ones of the plurality of at least partially coherent signal pulses and further comprising the step of varying the time intervals between the plurality of at least partially coherent signal pulses by tuning a signal pulse train cavity.

16. The method of claim 14 where in the step of generating the reference pulse train, the reference pulse train is generated in a cavity comprising at least a pair of opposing cavity mirrors at opposing ends of an optical axis of the cavity, and where the plurality of the reference pulses is generated corresponding to one of the signal pulses, each reference pulse of the corresponding plurality being provided with a different propagation direction by slanting one of the cavity mirrors relative to the optical axis to avoid optical symmetry within the cavity.

17. The method of claim 10 where multiplexing holograms in the medium or camera includes the step of recording amplitude, phase and three-dimensional information of the scattered pulse from the object.

18. The method of claim 10 where the step of providing the medium or camera for recording multiple holograms comprises providing more than one frame of a camera image and where each different spatial direction of the plurality of at least partially coherent reference pulses corresponds to a different interference pattern or carrier frequency corresponding to a different frame of the camera image.

19. The method of claim 18 further comprising the steps of:

Fourier transforming each hologram;

selectively filtering the Fourier transform of each hologram to select one of the multiple holograms recorded in the at least one frame of the camera image; and inversely Fourier transforming the selectively filtered Fourier transform of each hologram to reconstruct an image of the selected hologram.

* * * * *